Oct. 6, 1964
T. D. MARTIN
3,151,468
LIQUID LEVEL CONTROL FOR COLD TRAPS
Filed April 26, 1962
3 Sheets-Sheet 1
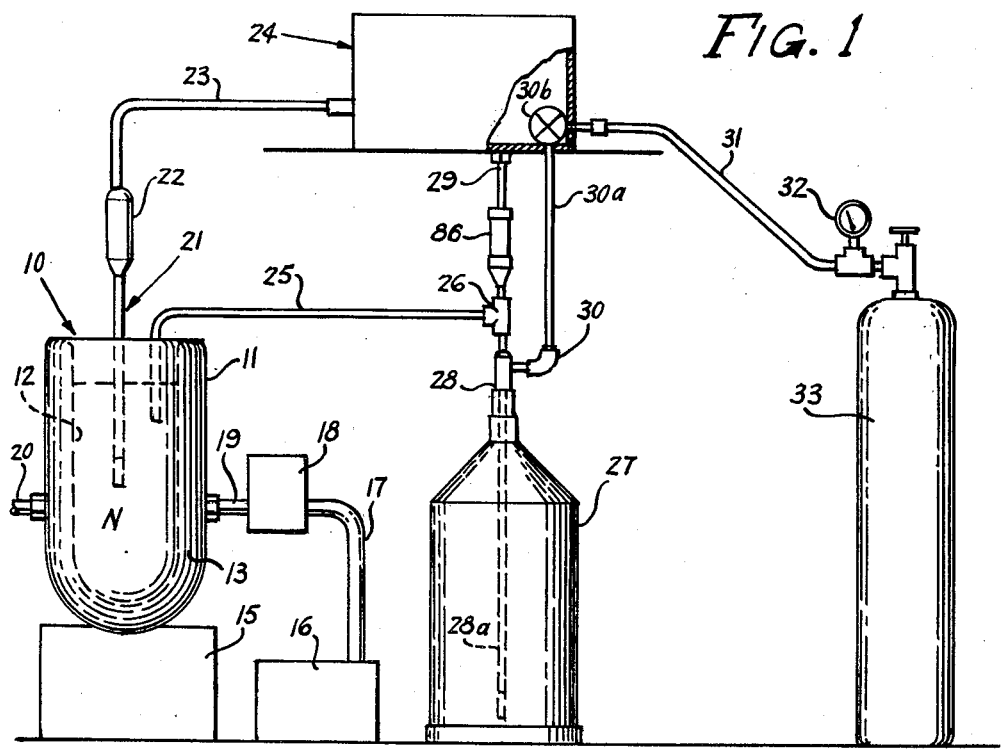
FIG. 1
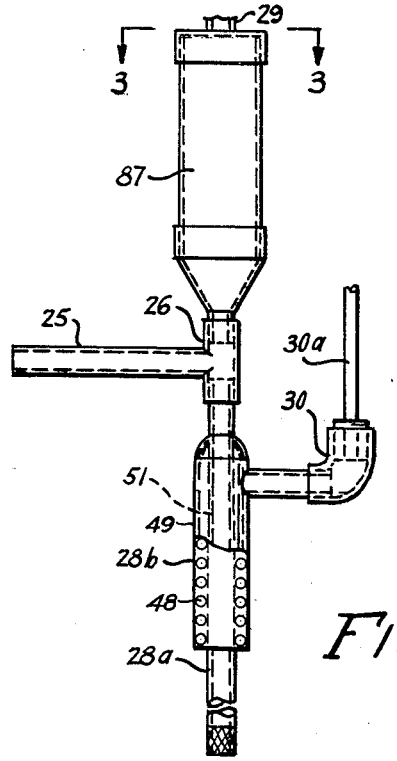
FIG. 2
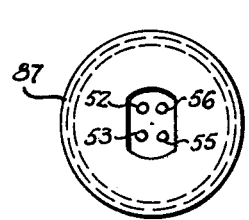
FIG. 3
FIG. 4
INVENTOR.
THOMAS D. MARTIN
BY Kimmel & Crowell
ATTORNEYS.

Oct. 6, 1964  T. D. MARTIN  3,151,468
LIQUID LEVEL CONTROL FOR COLD TRAPS
Filed April 26, 1962  3 Sheets-Sheet 2

INVENTOR.
THOMAS D. MARTIN
BY
Kimmel & Crowell
ATTORNEYS.

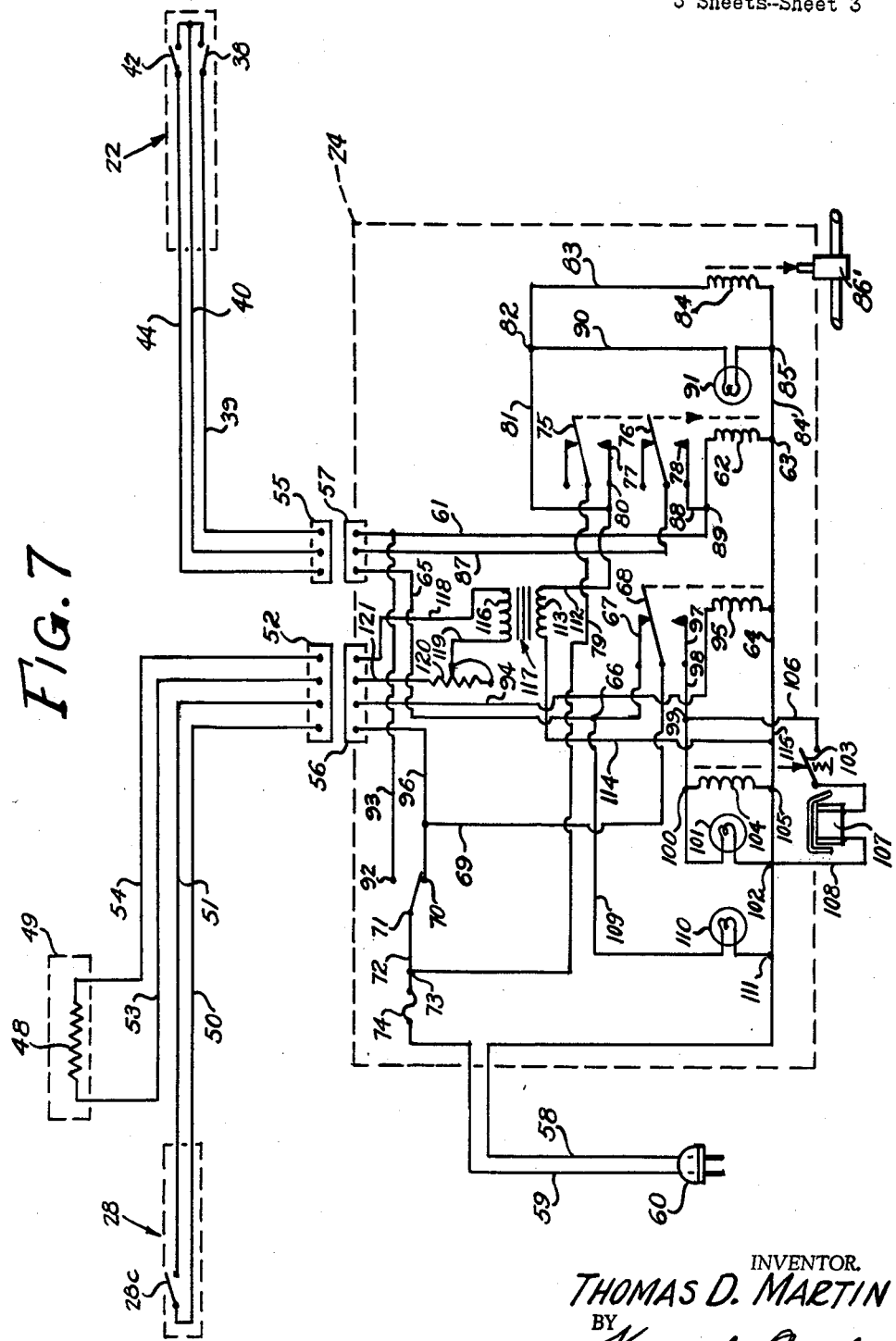

United States Patent Office 3,151,468
Patented Oct. 6, 1964

3,151,468
LIQUID LEVEL CONTROL FOR COLD TRAPS
Thomas Dillon Martin, Annandale, Va., assignor to Cryogenics, Inc., Stafford, Va., a corporation of Florida
Filed Apr. 26, 1962, Ser. No. 190,410
7 Claims. (Cl. 62—55)

This invention relates to a liquid level control system for cold traps and has particular applicability to that type of cold trap employing liquid nitrogen which is used in the vacuum industry, primarily for the purpose of freezing out impurities in high vacuum systems.

A primary object of this invention is the provision of a means for automatically controlling the level of liquid nitrogen in such a cold trap by means of an electrically controlled valve from a liquid nitrogen supply which is automatically actuated when the level of liquid nitrogen in the cold trap falls below a predetermined point, and automatically closed when the desired level of liquid nitrogen is restored.

An additional object of the invention is the provision of an electrical circuit which is actuated by a dual sensing probe, the probe having components which at a predetermined low liquid level in the cold trap, will open a valve for the introduction of additional nitrogen, and which, at a predetermined high level, will close the valve.

A further and more specific object of the invention is the provision of additional circuitry also controlled by a sensing probe which will indicate to an operator upon a call for additional liquid nitrogen by the first probe any condition in which such additional supply is unavailable, by the actuating of either an audible or visible alarm.

A more specific object of the invention is the provision of an improved probe for use in a liquid nitrogen cold trap, which will actuate a control circuit to open a valve upon the achievement of a predetermined fluid level and reclose the valve upon the achievement of a second predetermined level.

A further specific object of the invention is the provision of a control box of relatively small size and easy portability which may be applied to any cold trap and its supply container with a minimum of effort and difficulty.

A further specific object of the invention resides in the arrangement wherein the components of the mechanism, such as the sensing probes, control elements and the empty Dewar indicators and controls may be readily interchanged as desired or necessary.

Still other objects reside in the combinations of elements, arrangements of parts, and features of construction, all as will be more fully pointed out hereinafter and shown in the accompanying drawings wherein there is disclosed a preferred embodiment of this inventive concept.

In the drawings:

FIGURE 1 is a schematic view of a cold trap as employed in the vacuum industry for freezing out impurities, having the control system of the instant invention applied thereto.

FIGURE 2 is an enlarged side elevational detailed view of one of the probes employed in conjunction with the system of FIGURE 1.

FIGURE 3 is a top plan view taken substantially along the line 3—3 of FIGURE 2, and looking in the direction indicated by the arrows.

FIGURE 4 is an enlarged side elevational view of the probe employed in the trap per se.

Similar reference characters refer to similar parts throughout the several views of the drawing.

Figure 5:
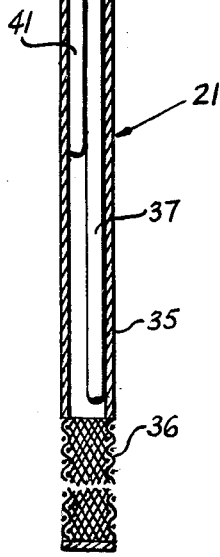
FIGURE 5 is an enlarged detailed sectional view taken substantially along the section line 5—5 of FIGURE 4 as viewed in the direction indicated by the arrows.
Figure 6:
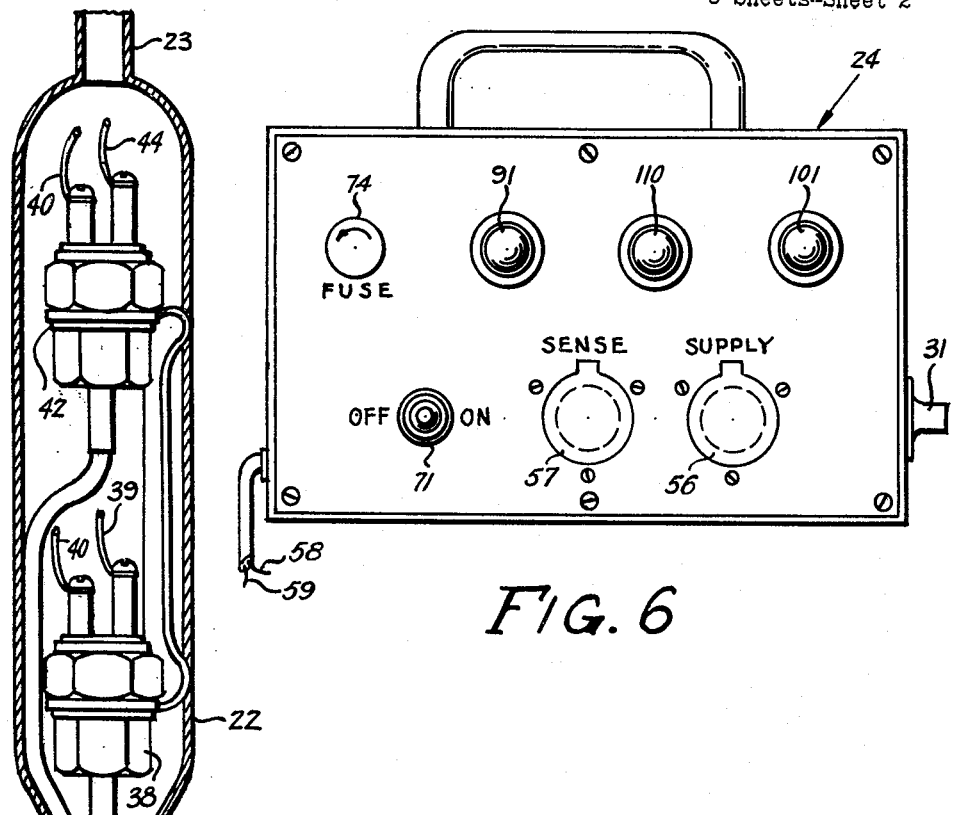
FIGURE 6 is an elevational view of one form of control box adapted for use with the system of the instant invention; and, FIGURE 7 is a schematic view disclosing the circuitry of the control box and its associated probes as well as the various valves and signals actuated thereby.

Having reference now to the drawings in detail, there is generally indicated at 10 a cold trap of conventional design which includes a receptacle having an outer wall 11 and an inner wall 12, the inner wall defining a receptacle for liquid nitrogen or a similar cooling medium, and the space between walls 11 and 12, indicated at 13, being adapted for the circulation of gas or other fluid media from which it is desired to freeze out impurities. As is conventional in such systems, the cold trap is supported on a base 15, and includes a mechanical vacuum pump 16 from which a connection 17 leads to a diffusion pump 18, the latter being connected through a line 19 to the space 13, an oppositely disposed line 20 (see FIG. 1) extending to any desired locale to be evacuated.

A sensing probe, generally indicated at 21, extends into the liquid nitrogen N in the cold trap defined by the inner wall 12, and includes an enlarged switch containing portion 22 from which wiring extends through a conduit 23 to a control box generally indicated at 24, all to be more fully described hereinafter.

A liquid nitrogen supply line 25 extends through a T 26 to a Dewar 27, which contains a secondary probe 28. The probe 28 is connected electrically through conductors 52 and 53 within a conduit 29 to the control box 24, the conduit 29 extending from the top of the probe. A fitting 30 connects Dewar 27, through a line 30a with the control box 24. A pressure supply line 31 leads through a conventional pressure gauge 32 from an electro-magnetically actuated valve 30b in the control box 24 to a tank 33, which contains gas under pressure. It is to be understood that the liquid nitrogen contained in the Dewar 27, may be pressurized in any other desired conventional manner, such, for example, as a self-pressurized Dewar, or by any other conventional application.

Referring now to the sensing probe 21, which is shown in detail in FIGURE 5, the latter is comprised by a tubular member 35 provided with an inlet 36, within which is contained a first sensing element or probe 37 preferably comprised of small diameter copper tubing which extends to a normally open switch 38, to be more fully described hereinafter, from which conductors 39 and 40 extend through the conduit 23. A second similar but shorter sensing element or probe 41 is also provided and extends to a second normally open switch 42 from which wires 40 and 44 also extend through the conduit 23, the wire 40 being a common conductor for the switches 38 and 42.

The two sensing probes 37 and 41 control, in a manner to be more fully described hereinafter, the level of nitrogen or other cryogenic fluid in the cold trap 10, it being pointed out that when the level of the nitrogen falls below the tip of probe 41 switch 42 closes, and when the level falls below the tip of sensory probe 37, switch 38 closes, to open a valve which admits liquid nitrogen to the trap 10 until the nitrogen covers the tips of both probes 41 and 42, at which time the valve admitting the nitrogen is closed, also in a manner to be more fully described hereinafter. Each probe is comprised by a length of small diameter copper tubing, or the like, to provide a good thermal path from one end to the other. The unit is charged at room temperature to a pressure somewhat in excess of that required to actuate its associated switches, it being pointed out that both switches 38 and 42 are normally open and pressure responsive electrical contact switches. The charging substance of the sensory probe is generally, but not necessarily, the gaseous phase of the cryogenic liquid whose level is to be controlled, in this case, nitrogen. The charging pressure is generally ten times the pressure required to actuate the switch. When the tip of a sensory probe is immersed through the surface of the liquid nitrogen, heat leaves the tip much faster than it can be supplied through the thermal path provided by the copper tube, and its temperature rapidly drops to one approaching that of the cryogenic liquid. The gaseous phase within the tube thus condenses to the liquid phase, and the pressure drops, retaining the switch or switches in their open positions. Thus, when probes 35 and 41 have their tips immersed in liquid nitrogen, the switches are open and there is no control circuit established to refill the cold trap. Conversely, when the tip of the probe 37 is exposed due to the drop of liquid level therebelow, the associated switch 38 is closed, it being pointed out that the switch 42 has already been closed, since the tip of probe 41 is above the level of the fluid. The closure of both switches takes place and a circuit is established due to the fact that the fluid in both probes gains heat through the thermal path, and the liquid phase within the tube changes to the gaseous phase, thus raising the pressure and closing the switches.

As liquid nitrogen is supplied to the trap in a manner to be more fully described hereinafter, the tip of probe 37 is first covered breaking the circuit through switch 38, but not until the tip of probe 41 is covered thus opening switch 42 and breaking a holding circuit to energize the nitrogen supply valve. Probe 28 in Dewar 27 is substantially similar in general construction to the previously described probe 21, with the exception of the fact that the tube 28a thereof contains only a single sensing probe element and extends substantially to the bottom of Dewar 27, as best shown in FIG. 1. A normally open switch, substantially identical to the switches 38 and 42, is contained in the enlarged portion 28b of the probe, this switch being indicated at 28c in FIG. 7. A resistance or heating element 48 is contained in a casing 49 for the purpose of heating the probe more rapidly, so that it may perform its intended function, to be shortly described. As previously mentioned, the function of probe 28 is to control an alarm, either visual or audible, when the circuits established through probe 21 call for more nitrogen in the trap 10, and the contents of Dewar 27 are exhausted. Conductors 50 and 51 extend from probe 28 to a terminal plug 52, while conductors 53 and 54 extend from the same terminal plug to the resistance heater 48. Similarly, conductors 39 and 44, and the common conductor 40, extend to a terminal plug 55. The terminal plug 52 is adapted to be plugged into a receiving socket 56 carried by control box 24, and the terminal plug 55 is adapted to be inserted into a similar socket 57, also carried by the control box.

In the use and operation of the device, after the probes 21 and 28 are appropriately positioned in the manner previously described, all of the switches 38, 42, and 28c are open and no circuit is established. The control box 24 has connected thereto a power line, which is comprised by conductors 58 and 59, the latter extending to a conventional plug 60 for reception into any conventional electric light plug socket for energization of the circuitry. As the nitrogen level in cold trap 10 falls below the tip of sensing probe 41, the associated switch 42 is closed. At this time no action takes place, and as the level of nitrogen in trap 10 continues to fall to expose the tip of probe 37, switch 38 is closed. Closure of both switches 42 and 38 establishes a circuit through the terminal plug 55 and the socket 57 over a conductor 61 through the winding of a relay 62, and through a junction 63 to the common return conductor 64. The opposite side of the circuit is over a conductor 65, which extends to a junction 66 and thence over a contact 67 to a fixed contact 68 of a manually operated switch 71. A conductor 72 extends through a junction 73 to a fuse 74, which is in series with the power conductor 59.

Energization of the relay 62 causes its armatures 75 and 76 to move from the positions shown in FIGURE 7, to establish contact with the fixed contacts 75 and 76, respectively. With the relay thus closed, a circuit is established through armature 75, over a conductor 80, to junction 73 and thence to conductor 59 of the power line. The circuit continues through a fixed contact 75 of the relay to a terminal 80, over a conductor 81, through a junction 82, and over a conductor 83 to one side of the winding of an electromagnet 84; the other side of the winding of this electromagnet is connected to the common return conductor 84' at a junction 63. Energization of the electromagnet 84 serves to open the nitrogen supply valve 86, which admits nitrogen from the Dewar 27 through the line 25 into the cold trap 10. The flow of nitrogen continues after the tip of the sensing probe 37 has been covered, which allows switch 38 to open, a holding circuit being established over a conductor 84' and the common conductor 40 to the switch 42. This conductor 84' extends to the armature 78 of the relay 62 which, when the relay is energized, closes on a fixed contact 78, which is connected by a conductor 88 to a junction 89, forming a shunt around the switch 38, and holding the relay 62 closed, which in turn keeps the electromagnet 84 energized.

A conductor 90 having a signal light 91 therein extends between the junctions 82 and 85, and remains illuminated as long as the winding of the electromagnet 84 is energized and the valve 86 is open. As the liquid level rises to cover the tip of the sensing probe 41, switch 42 opens, which de-energizes the primary circuit of relay 62 and the circuit of the electromagnet 84 to close the supply valve 86, which then remains closed until such time as both switches 42 and 38 are reclosed by a drop in the liquid level in the cold trap 10.

It may be pointed out here that, when the manually operated switch 71 is moved to its alternate position and engages a fixed contact 92, a direct circuit is established over a conductor 93 to the conductor 61, which direct circuit passes through the winding of the relay 62 to the common return conductor 64, thus manually operating the valve 86 independently of the open or closed condition of the switches 38 and 42.

Heretofore, the normal operation of the liquid level control has been described, when there is an adequate supply of liquid nitrogen in the Dewar 27. When, however, the level in the Dewar falls below the tip of the sensing probe 28 therein, the switch 28c is closed, which establishes a circuit over the conductor 51, through the terminal plug 52, and terminal socket 56, and over a conductor 94. This conductor 94 extends to one side of the winding of a master relay 95, the other side of which is connected directly to the common return conductor 64; the other side of this circuit is over the conductor 50 and through terminal plug 52 and terminal socket 56, and over a conductor 96, which extends through switch contact 70 to the power conductor 59. Energization of the relay 95 moves its armature 68 onto a fixed contact 97, from which a conductor 98 extends to a junction 99, and thence through a visual signal light 101 to a junction 102 on the common return conductor 64. The relay 95 is then held energized from the power conductor 59 through this armature 68 and closes the circuit of the signal light 101.

A slave relay 104 has its winding connected between the junction 101 and a junction 105 on the common return conductor 64. This relay is also energized when the armature 68 closes on the fixed contact 97 of the master relay 95. Energization of this slave relay 104 closes a circuit from the junction 99 over a conductor 106 to an audible buzzer or bell 107, which is connected over a conductor 108 to the junction 102. This signal continues in operation until such time as the switch 71 is opened to break the automatic operating circuit and the Dewar 27 is replaced with a full Dewar, or automatically refilled. Also, a conductor 109 extends from the junction 66 to a signal light 110 to a junction 111 on the common return conductor 64, this light remaining illuminated as long as the circuit through the fixed contact 67 and the armature 68 of the master relay 95 is closed across the power conductor 59, and the common return conductor 64, thereby indicating that the master relay 95 is de-energized.

When the relay 62 is energized to move its armature 76 into engagement with the fixed contact 78, armature 75 simultaneously engages the fixed contact 80 and establishes a circuit in part over a conductor 112 to one side of the primary winding 113 of a power transformer, which is generally designated at 117. From the other side of the primary winding 113 a conductor 114 extends to a junction 115 on the common return conductor 64. Engagement of the armature 75 with the fixed contact 80 closes the circuit through the primary winding 113 of the transformer over the conductor 79 in the manner previously described. The secondary winding 116 of the transformer is connected on one side by a conductor 119 directly to the terminal socket 56, and through the terminal plug 52 and over the conductor 54 with the resistance or heating coil 48. The other side of the secondary winding 116 is connected by a conductor 119 to a rheostat 120 of a conventional type, preferably being of 10 amps. and 5 watts capacity. From this rheostat 120 a conductor 121 extends to the terminal socket 56, and from this socket the other side of the circuit is through the plug 52 and over the conductor 53 to the other side of resistance or heating coil 48. The arrangement is such that the closure of switch 28c immediately effects energization of the resistance or heating coil 48 for heating the secondary probe 28 and initiating operation of the alarm system.

It is to be noted that the closing of the switch 28c due to a low nitrogen level in the Dewar 27 does not operate either the visual indicating light 101 or the audible signal 107 until such time as nitrogen is called for in the cold trap by closure of both switches 38 and 42. When these switches are closed and no nitrogen is available from the source of supply, the indicating light and/or buzzer are immediately operated calling the attention of the operator to the condition so that it may be immediately remedied before the temperature in the cold trap 10 rises to an extent to render the cold trap ineffective for its intended purpose.

From the foregoing it will now be seen that there is herein provided an improved liquid level control for cold traps or the like, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A liquid level control for cryogenic fluid in a cold trap, comprised by a container for gas, a Dewar vessel, a conduit between the container and the Dewar vessel, a liquid conduit between the Dewar vessel and the cold trap, a supply valve means in said conduit, an electromagnet means for operating said supply valve means, a source of electrical power, a first temperature responsive sensing element including a first switch and having one end positioned at a low level in the cold trap, a second temperature responsive sensing element including a second switch and having one end positioned at a higher level in the cold trap, a relay having dual armatures and dual fixed contacts, a primary circuit for the relay from one side of the source of electrical power through said switches and the winding of the relay and to the other side of the source of electrical power for energizing the relay when the liquid in the cold trap falls to the said low level and de-energizing same when the liquid rises to the said higher level, a holding circuit from the side of the first switch opposite to the side of the latter connected to the source of electrical power through one armature and one fixed contact and the winding of the relay to the other side of the source of electrical power for keeping the relay energized after the first switch has reopened and until the second switch has opened, a valve energizing circuit operated by said relay from one side of the source of electrical power through the other armature and fixed contact and the winding of the relay, and through the winding of the electromagnet to the other side of the source of electrical power, an indicating device for showing when the relay is energized and the valve is open, and a circuit for the indicating device from one side of the winding and through the first armature and fixed contact of the relay and through the indicating device to the other side of the winding and the latter side of the source of electrical power.

2. A liquid level for cryogenic fluid in a cold trap, comprised by a container for gas, a Dewar vessel, a conduit between the container and the Dewar vessel, a liquid conduit between the Dewar vessel and the cold trap, a supply valve means in said conduit, an electromagnet means for operating said supply valve means, a source of electrical power, a single pole, double throw switch, a first temperature responsive sensing element including a first switch and having one end positioned at a low level in the cold trap, a second temperature responsive sensing element including a second switch and having one end positioned at a higher level in the cold trap, a relay, a primary circuit for the relay from one side of the source of electrical power through the single pole, double pole switch in one position of the latter, the first and second switches and the winding of the relay and to the other side of the source of electrical power for energizing the relay when the liquid in the cold trap falls to the said low level and de-energizing same when the liquid rises to the said higher level, an alternate primary circuit for said relay from the first side of the source of electrical power through the single pole, double throw switch in the second position of the latter to the first side of the winding of the relay, and a valve energizing circuit operated by said relay from one side of the source of electrical power through the contacts of the relay and the winding of the electromagnet to the other side of the source of electrical power.

3. A liquid level control for cryogenic fluid in a cold trap, comprised by a container for the gas, a Dewar vessel, a conduit between the container and the Dewar vessel, a liquid conduit between the Dewar vessel and the cold trap, a supply valve means in said conduit, an electromagnet means for operating said supply valve means, a source of electrical power, a first temperature responsive sensing element including a first switch and having one end positioned at a low level in the cold trap, a second temperature responsive sensing element including a second switch and having one end positioned at a higher level in the cold trap, a third temperature responsive sensing element including a third switch and having one end positioned at a low level in the Dewar vessel, a first relay having an armature and a normally open contact, a second relay having an armature and a normally closed contact, a primary circuit for the first relay from one side of the source of electrical power through the armature and normally closed contact of the second relay, the first and second switches and the winding of the relay, and to the other side of the source of electrical power, for energizing the relay when the liquid in the cold trap falls to the said low level and de-energizing same when the liquid rises to the said higher level, and a valve energizing circuit operated by said first relay from one side of the source of electrical power through the armature and contact of the relay and the winding of the electromagnet to the other side of the source of electrical power, a primary circuit for the second relay from one side of the source of electrical power, through the third switch, the winding of the relay and to the other side of the source of electrical power, an indicator lamp for showing when the second relay is de-energized, and a circuit for said indicator lamp from the normally closed contact of the second relay, through the lamp and to the latter side of the source of electrical power.

4. A liquid level control for cryogenic fluid in a cold trap, comprised by a container for the gas, a Dewar vessel, a conduit between the container and the Dewar vessel, a liquid conduit between the Dewar vessel and the cold trap, a supply valve means in said conduit, an electromagnet means for operating said supply valve means, a source of electrical power, a first temperature responsive sensing element including a first switch and having one end positioned at a low level in the cold trap, a second temperature responsive sensing element including a second switch and having one end positioned at a higher level in the cold trap, a third temperature responsive sensing element including a third switch and having one end positioned at a low level in the Dewar vessel, an electrical resistance heating element in the Dewar vessel adjacent the third temperature responsive sensing element, a first relay having an armature and a normally open contact, a second relay having an armature and a normally closed contact, a primary circuit for the first relay from one side of the source of electrical power through the armature and normally closed contact of the second relay, the first and second switches and the winding of the relay and the other side of the source of electrical power for energizing the relay when the liquid in the cold trap falls to the said low level and de-energizing same when the liquid rises to the said higher level, and a valve energizing circuit operated by said first relay from one side of the source of electrical power through the armature and contact of the relay and the winding of the electromagnet to the other side of the source of electrical power, a primary circuit for the second relay from one side of the source of electrical power, through the third switch, the winding of the relay, and to the other side of the source of electrical power, an indicator lamp for showing when the second relay is de-energized, a circuit for the indicator lamp from the normally closed contact of the second relay, through the lamp and to the latter side of a source of electrical power, and a circuit for the electrical resistance heating element controlled by the first relay.

5. A liquid level control for cryogenic fluid in a cold trap, comprised by a container for the gas, a Dewar vessel, a conduit between the container and the Dewar vessel, a liquid conduit between the Dewar vessel and the cold trap, a supply valve means in said conduit, an electromagnet means for operating said supply valve means, a source of electrical power, a first temperature responsive sensing element including a first switch and having one end positioned at a low level in the cold trap, a second temperature responsive sensing element including a second switch and having one end positioned at a higher level in the cold trap, a third temperature responsive sensing element including a third switch and having one end positioned at a low level in the Dewar vessel, an electrical resistance heating element in the Dewar vessel adjacent the third temperature responsive sensing element, a first relay having an armature and a normally open contact, a second relay having an armature and a normally closed contact, a primary circuit for the first relay from one side of the source of electrical power through the armature and normally closed contact of the second relay, the first and second switches and the winding of the relay and to the other side of the source of electrical power for energizing the relay when the liquid in the cold trap falls to the said low level and de-energizing same when the liquid rises to the said higher level, and a valve energizing circuit operated by said first relay from one side of the source of electrical power through the armature and contact of the relay and the winding of the electromagnet to the other side of the source of electrical power, a primary circuit for the second relay from one side of the source of electrical power, through the third switch, the winding of the relay, and to the other side of the source of electrical power, a transformer, a secondary circuit for the transformer through the electrical resistance heating element, and a primary circuit for the transformer from one side of the source of electrical power, through the armature and fixed contact of the first relay, through the primary winding of the transformer and to the other side of the source of electrical power.

6. A liquid level control for cryogenic fluid in a cold trap, comprised by a container for the gas, a Dewar vessel, a conduit between the container and the Dewar vessel, a liquid conduit between the Dewar vessel and the cold trap, a supply valve means in said conduit, an electromagnet means for operating said supply valve means, a source of electrical power, a first temperature responsive sensing element including a first switch and having one end positioned at a low level in the cold trap, a second temperature responsive sensing element including a second switch and having one end positioned at a higher level in the cold trap, a third temperature responsive sensing element including a third switch and having one end positioned at a low level in the Dewar vessel, a first relay having an armature and a normally open contact, a second relay having an armature and a normally closed contact, a primary circuit for the first relay from one side of the source of electrical power through the armature and normally closed contact of the second relay, the first and second switches and the winding of the relay, and to the other side of the source of electrical power for energizing the relay when the liquid in the cold trap falls to the said low level and de-energizing same when the liquid rises to the said higher level, and a valve energizing circuit operated by said first relay from one side of the source of electrical power through the armature and contact of the relay and the winding of the electromagnet, to the other side of the source of electrical power, a primary circuit for the second relay from one side of the source of electrical power, through the third switch, the winding of the relay, and to the other side of the source of electrical power, an indicator lamp for showing when the second relay is energized, and a circuit for said indicator lamp from the normally open contact of the second relay, through the indicator lamp, and to the latter side of the source of electrical power.

7. A liquid level control for cryogenic fluid in a cold trap, comprised by a container for the gas, a Dewar vessel, a conduit between the container and the Dewar vessel, a liquid conduit between the Dewar vessel and the cold trap, a supply valve means in said conduit, an electromagnet means for operating said supply valve means, a source of electrical power, a first temperature responsive sensing element including a first switch and having one end positioned at a low level in the cold trap, a second temperature responsive sensing element including a second switch and having one end positioned at a higher level in the cold trap, a third temperature responsive sensing element including a third switch and having one end positioned at a lower level in the Dewar vessel, a first relay having an armature and a normally open contact, a master relay havving an armature and a normally closed and a normally open contact, a slave relay having an armature and a normally open contact, a primary circuit for the first relay from one side of the source of electrical power through the armature and normally closed contact of the master relay, the first and second switches and the winding of the relay, and to the other side of the source of electrical power for energizing the relay when the liquid in the cold trap falls to the said low level and de-energizing same when the liquid rises to the said higher level, and a valve energizing circuit operated by said first relay from one side of the source of electrical power through the armature and contact of the relay and the winding of the electromagnet to the other side of the source of electrical power, a primary circuit for the master relay from one side of the source of electrical power through the third switch, the winding of the relay, and to the other side of the source of electrical power, a primary circuit for the slave relay from one side of the source of electrical power, through the armature and normally open contact of the master relay, the winding of the relay, and to the other side of the source of electrical power, an audible signal device for indicating when the master and slave relays are energized, and a circuit for the audible signal device from one side of the source of electrical power, through the armature and normally open contact of the master relay, the armature and normally open contact of the slave relay, the audible signal device, and to the other side of the source of electrical power.

References Cited in the file of this patent

UNITED STATES PATENTS

| | | |
|---|---|---|
| 2,687,740 | Jarund | Aug. 31, 1954 |
| 2,756,765 | Agule | July 21, 1956 |
| 2,761,924 | Keenan | Sept. 4, 1956 |
| 3,049,887 | Sharp | Aug. 21, 1962 |